No. 683,078. Patented Sept. 24, 1901.
H. C. SPALDING.
MEANS FOR TRANSPORTING RIGID BODIES.
(Application filed Nov. 13, 1900.)

(No Model.) 10 Sheets—Sheet 1.

Witnesses:

Inventor:
Harry Curtis Spalding

THE NORRIS PETERS CO., PHOTO-LITHO., WASHINGTON, D. C.

No. 683,078. Patented Sept. 24, 1901.
H. C. SPALDING.
MEANS FOR TRANSPORTING RIGID BODIES.
(Application filed Nov. 13, 1900.)

(No Model.) 10 Sheets—Sheet 2.

Witnesses:
A B Mattingly
C J Sawyer

Inventor:
Henry Curtis Spalding

No. 683,078. Patented Sept. 24, 1901.
H. C. SPALDING.
MEANS FOR TRANSPORTING RIGID BODIES.
(Application filed Nov. 13, 1900.)

(No Model.) 10 Sheets—Sheet 3.

Witnesses: Fig.4. Inventor:
A. B. Mattingly Henry Curtis Spalding
C. J. Sawyer

No. 683,078. Patented Sept. 24, 1901.
H. C. SPALDING.
MEANS FOR TRANSPORTING RIGID BODIES.
(Application filed Nov. 13, 1900.)

(No Model.) 10 Sheets—Sheet 7.

Witnesses: Inventor:

No. 683,078. Patented Sept. 24, 1901.
H. C. SPALDING.
MEANS FOR TRANSPORTING RIGID BODIES.
(Application filed Nov. 13, 1900.)
(No Model.) 10 Sheets—Sheet 8.

Witnesses
A. B. Mattingly
E. J. Sawyer

Inventor:
Henry Curtis Spalding

No. 683,078. Patented Sept. 24, 1901.
H. C. SPALDING.
MEANS FOR TRANSPORTING RIGID BODIES.
(Application filed Nov. 13, 1900.)
(No Model.) 10 Sheets—Sheet 9.

Witnesses:
A. B. Mattingly
C. J. Sawyer

Inventor:
Henry Curtis Spalding

THE NORRIS PETERS CO., PHOTO-LITHO., WASHINGTON, D. C.

No. 683,078. Patented Sept. 24, 1901.
H. C. SPALDING.
MEANS FOR TRANSPORTING RIGID BODIES.
(Application filed Nov. 13, 1900.)
(No Model.) 10 Sheets—Sheet 10.

Witnesses:
A. B. Mattingly
C. J. Sawyer

Inventor:
Henry Curtis Spalding

THE NORRIS PETERS CO., PHOTO-LITHO., WASHINGTON, D. C.

UNITED STATES PATENT OFFICE.

HENRY CURTIS SPALDING, OF NEW YORK, N. Y.

MEANS FOR TRANSPORTING RIGID BODIES.

SPECIFICATION forming part of Letters Patent No. 683,078, dated September 24, 1901.

Application filed November 13, 1900. Serial No. 36,337. (No model.)

*To all whom it may concern:*

Be it known that I, HENRY CURTIS SPALDING, a citizen of the United States, residing at the city of New York, in the county of New York and State of New York, have invented certain new and useful Improvements in Means for Transporting Rigid Bodies, fully described and represented in the following specification and the accompanying drawings, forming a part of the same.

My invention is adapted especially for use in connection with marine railways, but is applicable also wherever it is desirable to move long and rigid bodies or structures upon wheels along a railway having vertical curves or grades of short radii, the object of the invention being to provide means for compensating for the undulating motion of the trucks, so as to hold the rigid body or structure carried thereby in proper position.

With this object in view the invention consists in certain features of construction and combinations of parts, all as fully described and specifically claimed herein.

For a full understanding of the invention I have shown in the accompanying drawings, forming a part of this specification, a construction embodying the structural features of the invention in their preferred form, and this construction will now be described in connection with the drawings, in which—

Fig. 20 is an end view of the cylinders employed for automatically adjusting the strains on the hauling-cables, and Fig. 21 is a sectional elevation of the cylinders, plungers, and supply-pipe thereof.

Similar letters refer to similar parts throughout the several views.

Figure 1:
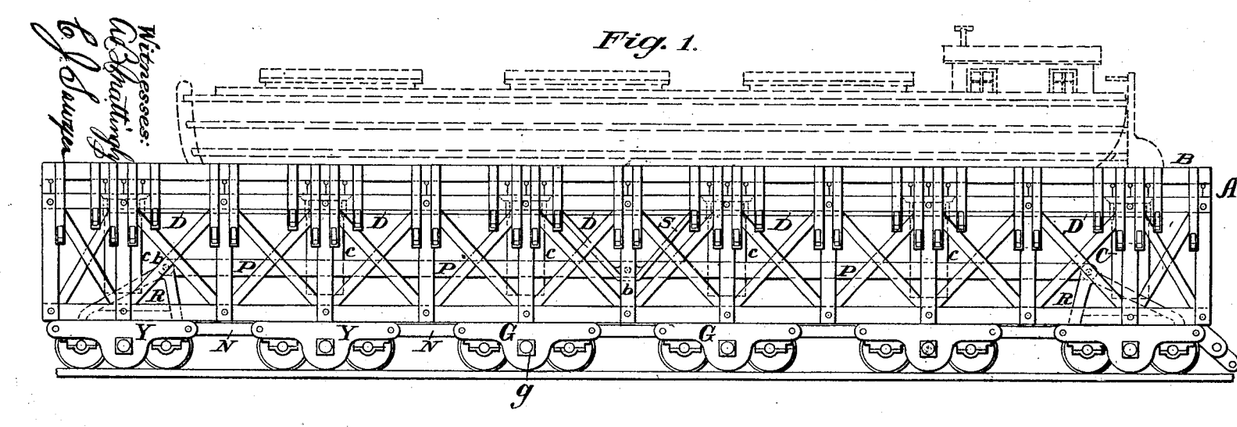
Figure 1 is a longitudinal view in elevation of the carriage on a horizontal way.
Figure 2:
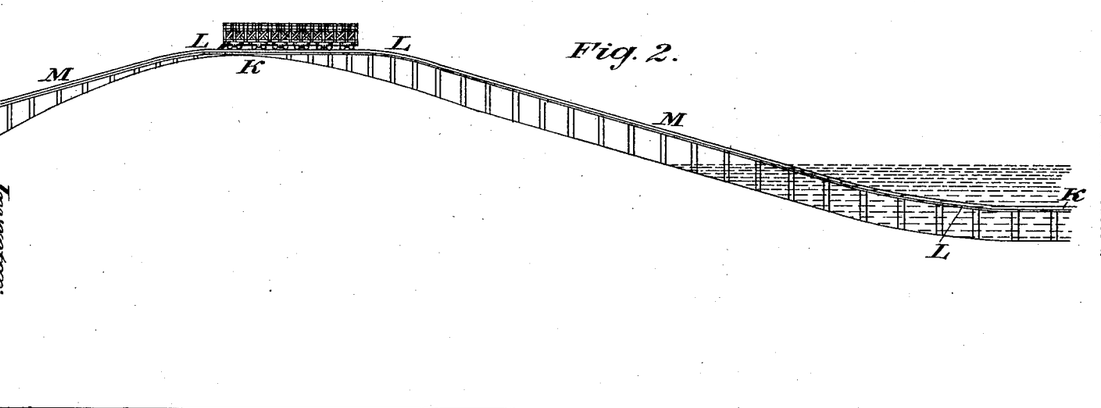
Fig. 2 is a longitudinal view in elevation of a section of railway, including vertical curves of short radius and a carriage thereon.
Figure 3:
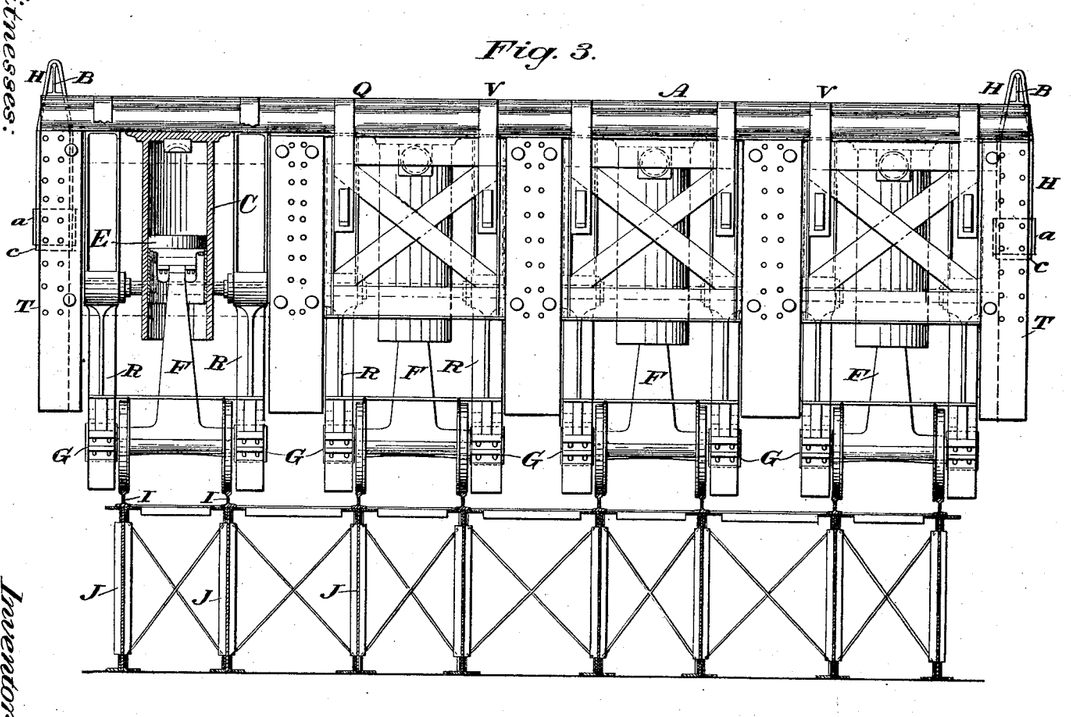
Fig. 3 is an end view of the carriage and a section of the structure which supports the railway.
Figure 4:
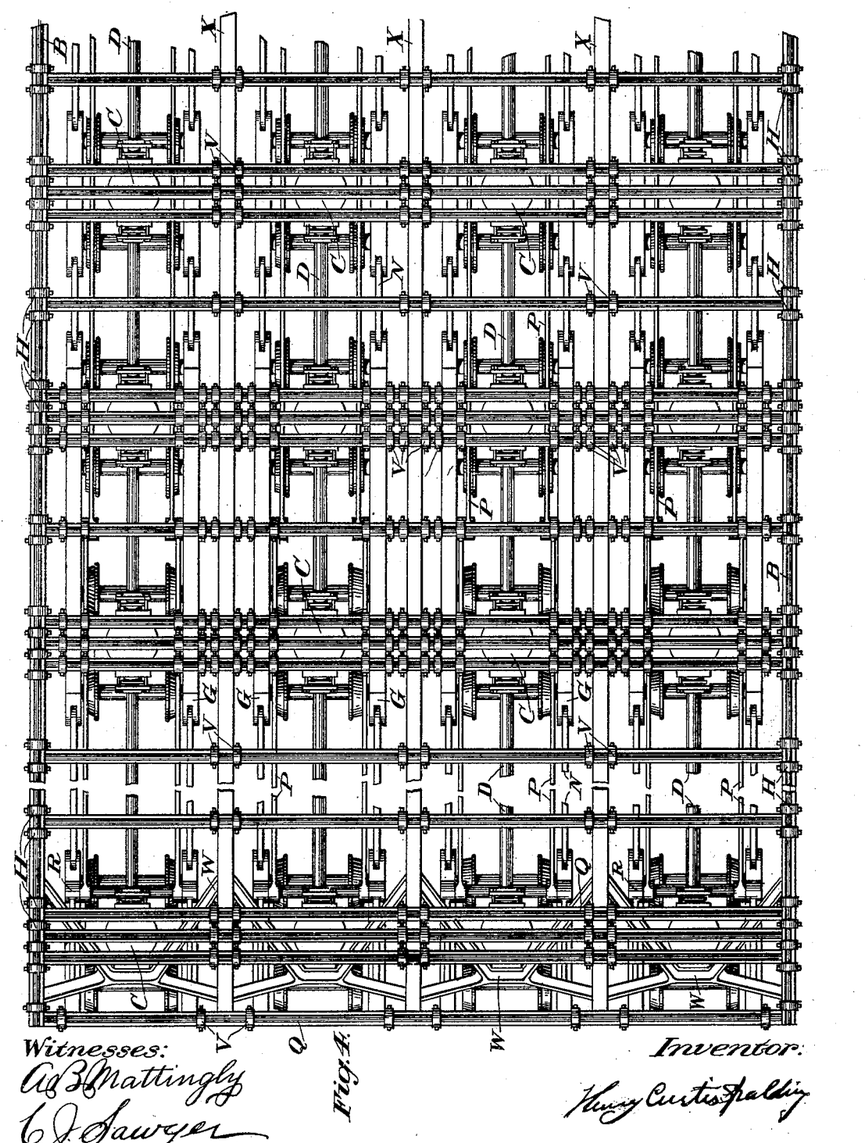
Fig. 4 is a plan view of portions of the carriage, showing one end and part of the central section broken off.
Figure 5:
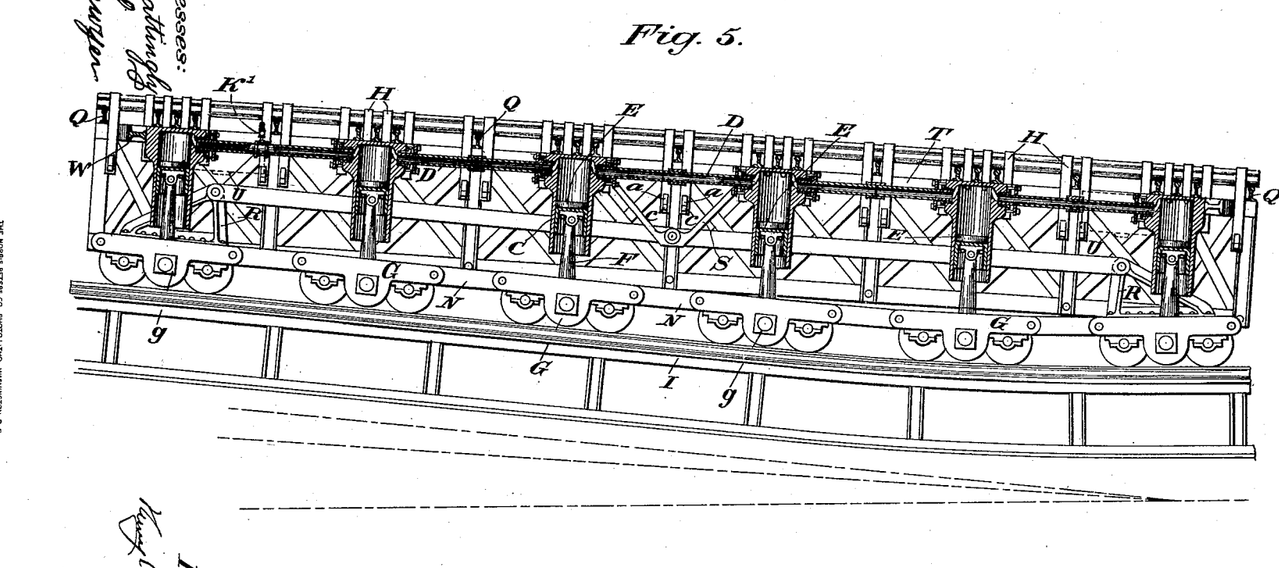
Fig. 5 is a longitudinal elevation of the carriage, showing sections of the cylinders and plungers on a vertical curve, the track and substructure supporting the same, also the trucks and the link systems which connect the trucks together, and the pipes which connect together serially the several cylinders.
Figure 6:
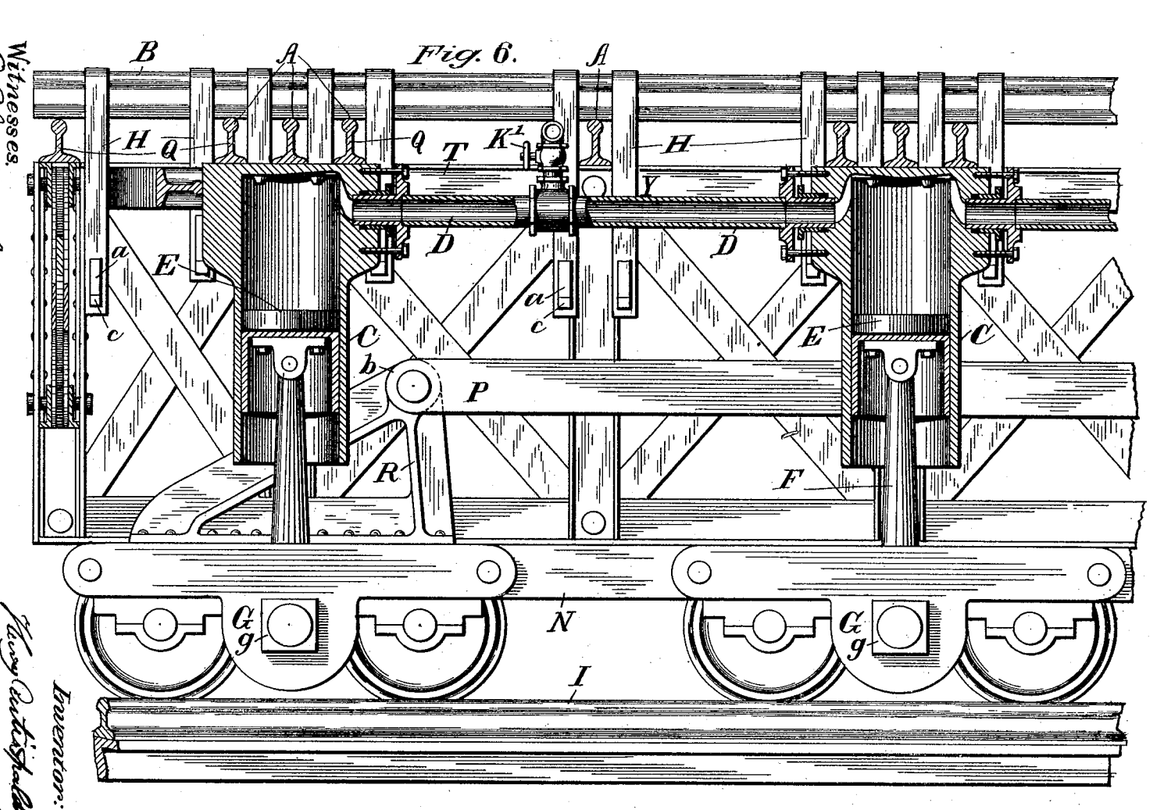
Fig. 6 is a side elevation of two cylinders in section, their connecting-pipe, also sections of the yoke and the truss-framing at the end of the carriage.
Figure 7:
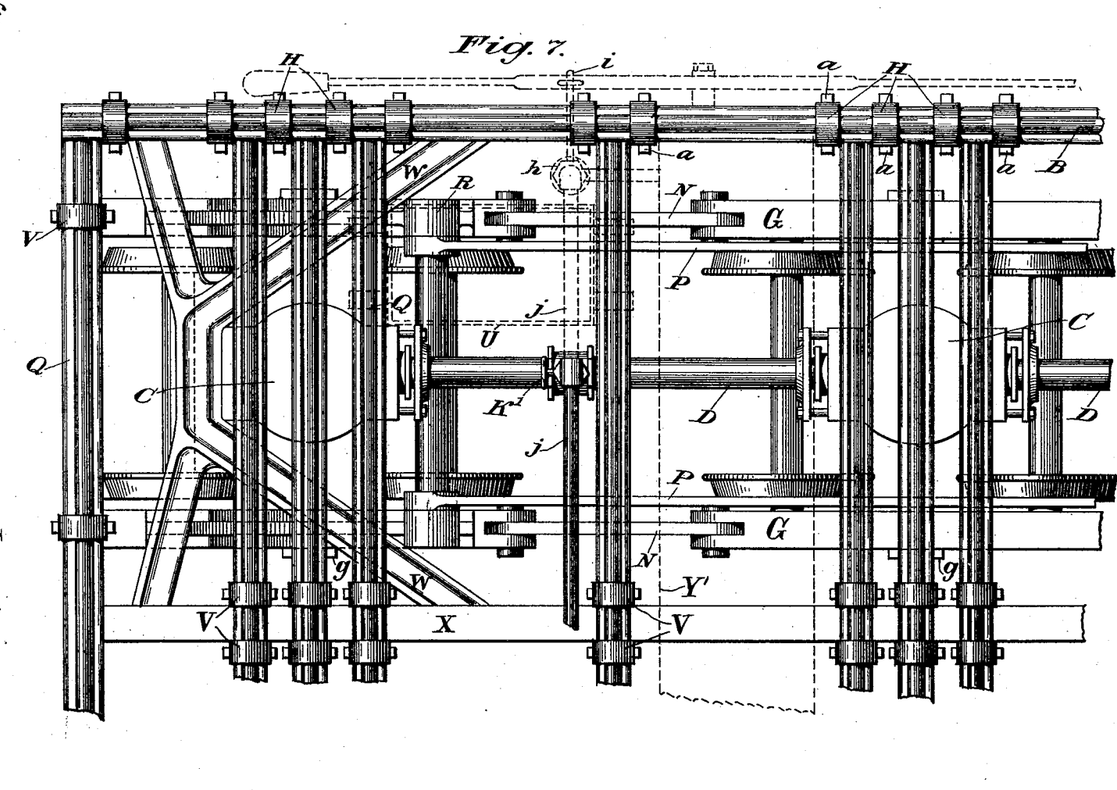
Fig. 7 is a plan view of that portion of the carriage shown in elevation in Fig. 6, showing the manner of counteracting the thrust upon the end cylinders and showing also the mechanisms by which the cylinders are supplied with the liquid which supports the load.
Figures 8, 9, 10, 11:
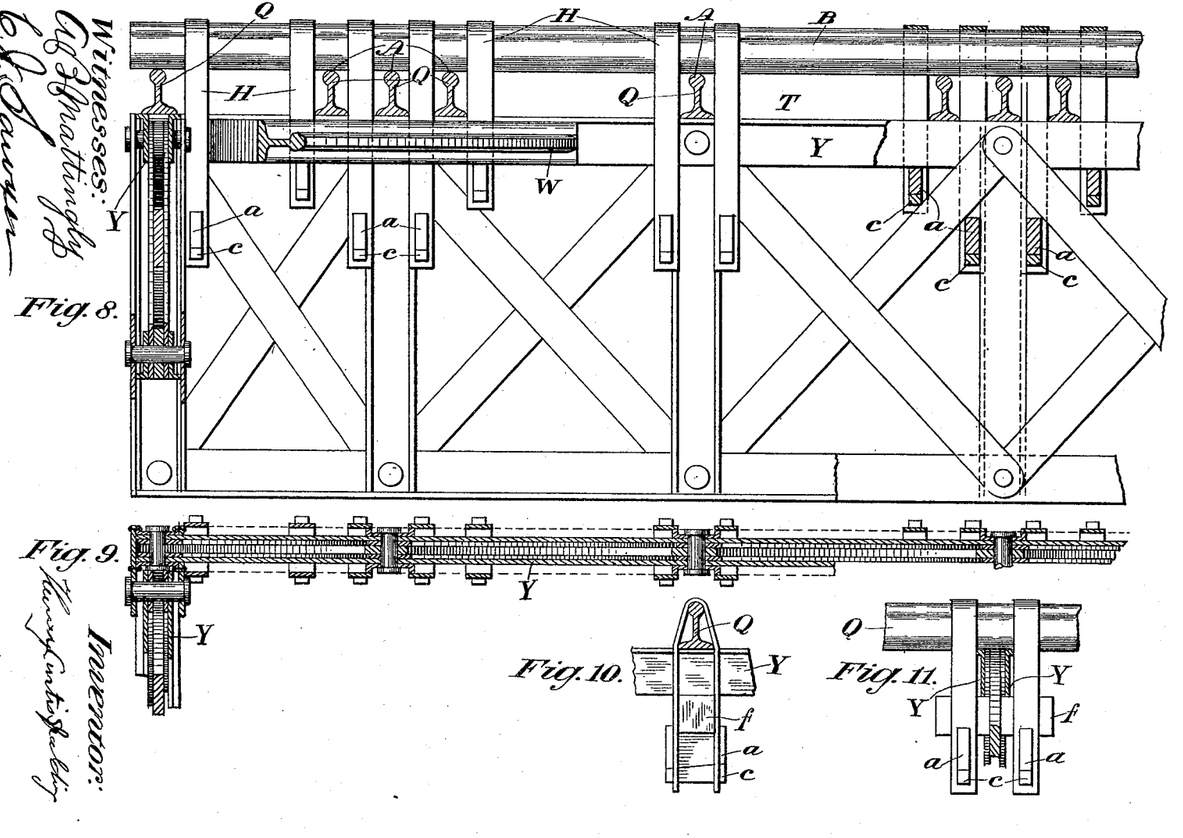
Fig. 8 is a side elevation of one end of the carriage structure, showing how it is framed.
Fig. 9 is a sectional view of the upper portion of Fig. 8, also illustrating the framing thereof.
Figs. 10 and 11 are details of the two preceding views.
Figure 12:
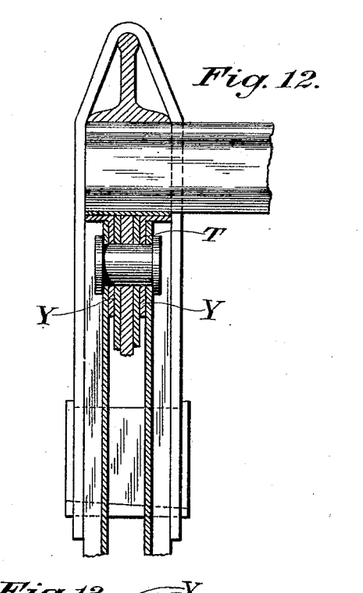
Figs. 12 and 13 are further illustrations of the methods of framing the structure.
Figure 13:
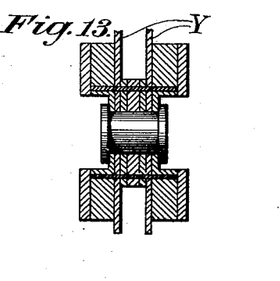
Figure 14:
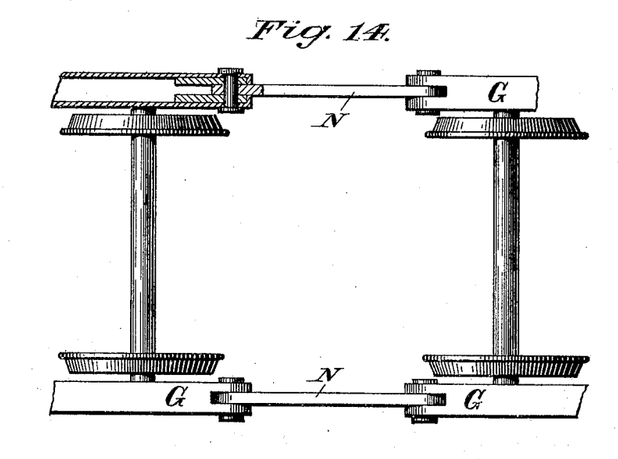
Fig. 14 is a plan view of a portion of two trucks, showing the connections between them.
Figure 15:
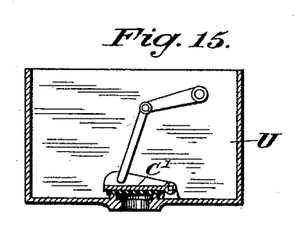
Fig. 15 is a sectional view of a ballast-tank with its valve.
Figure 16:
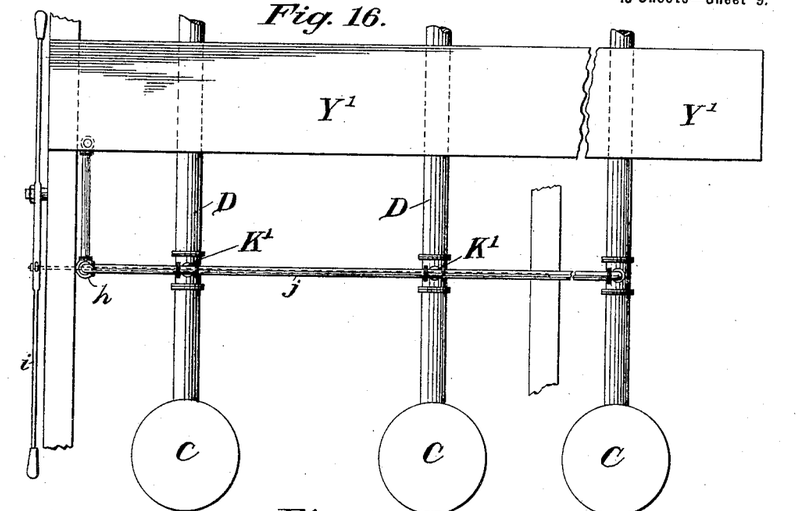
Figs. 16 and 17 are a plan and elevation of the tank, pump, and pipes for supplying the cylinders with liquid.
Figures 17, 18, 19:
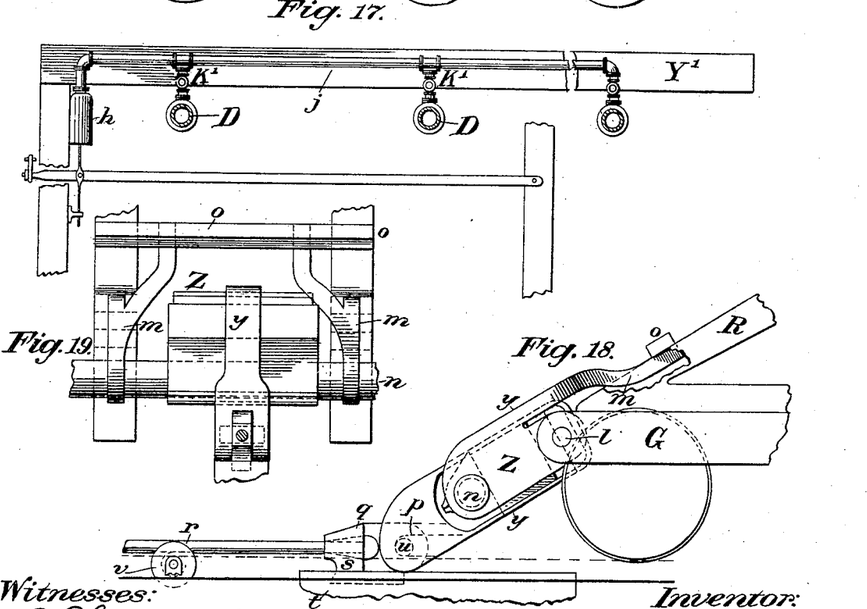
Fig. 18 is an elevation of the devices used in hauling the carriage.
Fig. 19 is a plan view of portions thereof.
Figures 20, 21, 23:
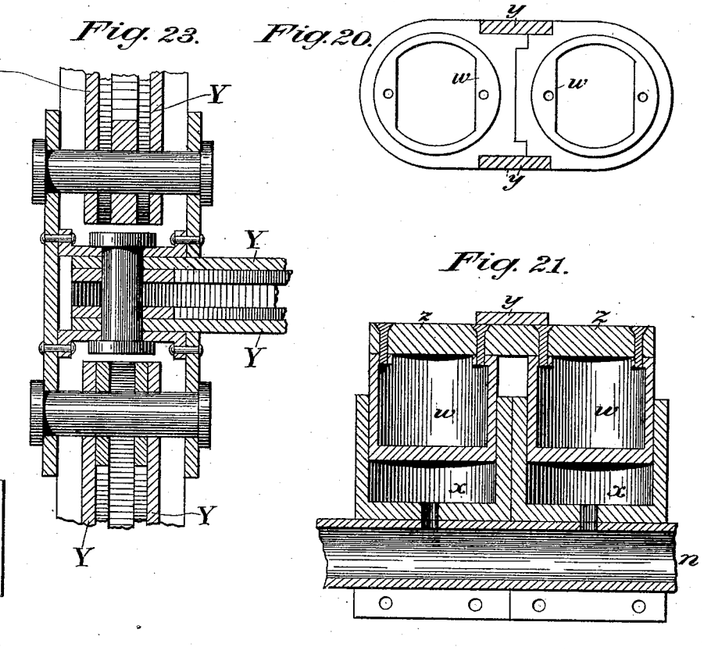
Figure 22:
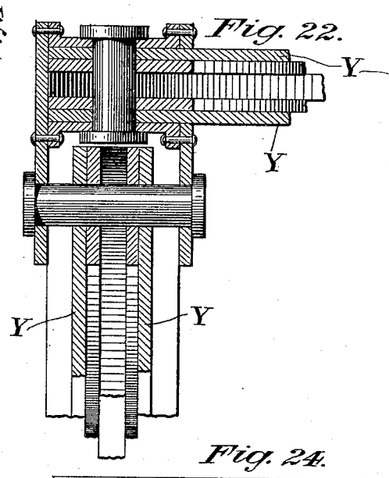
Fig. 22 shows the mode of fastening the end and longitudinal trusses together at the corners of the carriage, and Fig. 23 the mode of fastening the same together at the intermediate joints.
Figure 24:
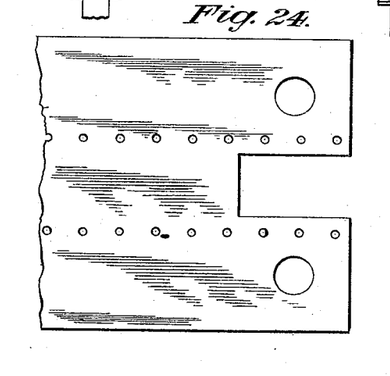
Fig. 24 shows the plates used at the latter.

The platform A may be of any suitable form, but is shown as of the type of structure well known as a "floating dock." In this instance, however, instead of floating upon a body of water it is supported by a liquid or other fluid confined in several series of cylinders C, which are secured rigidly to the bottom of the platform A. These cylinders are connected with each other by means of pipes D, which allow a free circulation of the liquid or other fluid through each series of cylinders longitudinally of the carriage, but not transversely to the carriage. The liquid or other fluid rests upon plungers E in the cylinders, (shown in section at the left-hand end of Fig. 3,) which in turn are supported by connecting-rods F, secured to the plungers E. These plungers and cylinders are preferably of the type used in the Otto and the Barker and other well-known gas-engines, but opening downward. The lower ends of the connecting-rods F rest upon and are pivotally connected to the trucks G. These trucks may be and are shown as of the usual railway type and rest upon the rails I, which are supported by the beams J. These beams may be supported by masonry of any suitable construction and be properly tied and braced to each other, so as to constitute an unyielding support to the superstructure. Rigid links N, serially jointed to the corners of the truck-frames O, hold the several trucks in a series to their relative distances from each other, while long connecting-bars P, jointed at $b$ to hangers R, secured to the end trucks of a series, and hangers S, secured to the bottom of the platform A, hold the trucks under the platform and prevent them from escaping therefrom. Trusses T at the sides and ends below the said platform increase the rigidity thereof. Other trusses suspended longitudinally therefrom between the trucks may also be added for the purpose of further increasing the strength of the platform to support the burden between the bearings. As in many cases the load may be greater at one end than at the other, ballast-tanks U are preferably provided. These are so suspended below the platform at each end that they will admit water over their tops when the platform is submerged. Any tendency to depression at one end may be corrected by opening the valve $c$, Fig. 15, and allowing the water to escape until such tendency is corrected. It will be well, however, when placing the burden upon the platform to so locate it that little or no necessity shall arise for such regulation. The rails I and beams J are illustrated partially in Fig. 2 as arranged so as to form three horizontal planes K, connected by four vertical curves L to two inclined planes M in such a manner as to form a continuous track. They can be made of any suitable length, and a less or greater number of planes may be employed. The gradients are preferably one foot vertical to ten horizontal, but may be of any other grade. The curves must be of such radii that the plungers E will not bottom in or be withdrawn from the cylinders C. Deck-beams B, extending the entire length of the platform A on either side thereof, tend to stiffen it longitudinally. They are secured to the side trusses T by means of the straps H, the keys $a$, and the wedges $c$. They also serve to hold the ends of the transverse deck-beams Q firmly between the longitudinal deck-beams B and the trusses T. The transverse deck-beams Q serve to tie together all the longitudinal trusses and form a platform A, upon which the load is supported. They are secured to the intermediate longitudinal trusses, as illustrated in Fig. 3, by means of straps V and by means of the keys $a$, wedges $c$, and cross-bars $f$, Fig. 11. These beams are also secured to and form the hanging support of the cylinders C. I prefer to make the truck-frames G of sheet-steel, cut out and struck up in the manner now well known in railway-work; but they are preferably of the outlines shown in the drawings. The boxes $g$, on which the connecting-rods F are journaled, (which are inserted into the said truck-frames,) are thus placed low down in the structure, thereby adding to the stability of the carriage, which is also aided by the branching form of the lower end of the said connecting-rods. As it is apparent that the pressure of the liquid with which the cylinders C and pipes D are filled must be great when the platform A is heavily loaded and that this pressure will be transmitted endwise along the said pipes, therefore means must be provided whereby the said cylinders at both ends of any series will be braced firmly in their respective positions, so as to resist the thrust occasioned by this pressure. For this purpose yokes W are provided, which bear centrally along the line of pressure upon the outer side of the end cylinders. These yokes are secured firmly to the longitudinal angle-bars Y, which form part of the upper members of the trusses T. As the said angle-bars extend the entire length of the carriage, the strains at the one end are exactly counterbalanced by the strains at the other end, thus securing the proper stability for the said cylinders at the extreme end of any series. For the purpose of readily supplying liquid to the pipes D and the cylinders C the tank Y', Figs. 16 and 17, is placed nearly in the center of the upper part of the carriage. A pump $h$ is connected thereto, operated by the double lever $i$. By this means liquid can be delivered through the small transverse feed-pipe $j$, which constitutes a connection between the said pump and the several series of main pipes D. At each junction between the said feed-pipe and the said main pipes is placed a stop-cock K', whereby the supply of liquid may be turned off from any of the pipes D whenever such pipe has received the proper quantum. By this means it is possible to supply any series of the pipes D and cylinders C without oversupplying any other series, and thus each series may be fitted to perform its part in sustainment of the load and in maintaining the proper position of the platform. Whenever it becomes desirable to employ hauling-cables for the purpose of moving the carriage as a means for equalizing strains upon the several cables, a special device Z is employed. (See Figs. 18, 19, 20, and 21.) This consists of several parts. The pivot $l$ connects to the truck-frame G, by means of the forked connecting-pieces $m$, a hollow hauling-bar $n$, which extends transversely the whole width of the carriage at each end thereof. These forked connecting-pieces are secured rigidly to the hauling-bar $n$ at their outer extremity. The long arm of the said fork is so shaped and arranged that at its upper end it may come into contact with a bar $o$, secured to the upper side of the hangers R, thus affording a detent which prevents too great a descent of the hook $p$. This hook is so adjusted as to engage with the clevis $q$ of the cable $r$. The said clevis is formed with a hooked lower side $s$, which engages with the hook-shaped detent $t$. The latter is fastened between the rails I of the track upon which the carriage moves. When the carriage in ascending reaches the point where the hook $p$ engages with the clevis-pins $u$, its further progress picks up the cable $r$, which is then lifted from the roller $v$ to such position as the strain thereupon may cause it to assume. When any one of the several cables $r$ is strained more than another, the inequality is corrected by the action of the plungers $w$ in the cylinders $x$. The hook $p$ is a portion of the strap $y$, which latter extends past the cylinders $x$ and continues around the cross-bar $z$, which is secured to the plungers $w$. By this means any undue strain on any one of the cables $r$ causes the plungers $w$ to penetrate farther into the cylinders $x$, with the result that some of the liquid contained therein will be forced into the hollow hauling-bar $n$ and thence distributed through the other cylinders $x$, which are mounted thereon. This operation will continue until any unequal disposition of the load on any cable is remedied.

The operation will be understood from a brief description. The burden to be transported is placed upon the platform in any suitable manner while the carriage is at either of the two ends of the railway and is properly secured thereupon, and then motion is imparted to the carriage. When the carriage arrives at the invert curve, the plungers E over the truck at the forward end of the carriage will force some of the contained liquid or other fluid out of the cylinders in which it is confined into the pipes D, and thus rearrange it longitudinally of the carriage by distribution into the other cylinders. This will in turn force the successive plungers downward until the next in series reaches the curve, whereupon the liquid or other fluid contained therein will be distributed until the central truck of the series in its turn reaches the curve. By that time the leading truck will have mounted so far on the invert curve that the plungers for the central truck will be forced farther downward by the pressure, and both the end plungers of the series will have been forced upward as a result of the varying pressures. The reverse of this process will occur when the carriage has ascended the incline to the summit curve; but when the summit plane is attained the contained liquid or fluid will be equalized in each of the cylinders of a series longitudinally of the carriage and the platform will resume its level position. Similar operations will occur at the time of descending from the summit plane over the invert curve to the level termination at the other end.

The apparatus herein described may be substituted for a series of locks in a waterway at places where there is a great difference of levels, thus diminishing the cost of construction and operation and reducing the time of transit. In such places when inclined planes have heretofore been used it has been found necessary to divide both carriages and boats into sections and connect the several sections together by hinges, thus only allowing of specially-constructed boats to be used thereon.

The mode of propulsion employed with the carriage described may be cable-hauling devices, as illustrated, or any other of the well-known means used in traversing steep grades, and any suitable brake system may be used. Therefore no special devices for propulsion or for brakes are described or illustrated herein.

It will be understood that the invention is not to be limited to the form or arrangement of the equalizing devices illustrated, but that these may be varied widely without departing from my invention.

What I claim, and desire to secure by Letters Patent of the United States, is—

1. The combination of a rigid burden-carrying platform provided with trucks and fluid-cylinders and plungers between the platform and trucks for supporting the platform by fluid contained in the cylinders, substantially as described.

2. The combination of a rigid platform and trucks, cylinders arranged longitudinally of the platform, and plungers in said cylinders supported by the trucks and supporting the platform by fluid contained in said cylinders, substantially as described.

3. The combination of a rigid platform and trucks, cylinders arranged longitudinally of the platform and plungers in said cylinders supported by the trucks and supporting the platform by fluid contained in said cylinders, and a pipe connecting the fluid-spaces of the cylinders throughout the series longitudinally of the platform, substantially as described.

4. The combination of the trucks, links N at opposite sides of and connecting said trucks, a rigid platform, cylinders arranged longitudinally of the platform and plungers supported by the trucks and supporting the platform by fluid contained in the cylinders, substantially as described.

5. The combination of the trucks, links N at opposite sides of and connecting said trucks, a rigid platform, cylinders arranged longitudinally of the platform, plungers supported by the trucks and supporting the platform by fluid contained in the cylinders, and a pipe connecting the fluid-spaces of the cylinders throughout the series longitudinally of the platform, substantially as described.

6. The combination of a rigid burden-carrying platform provided with trucks, and fluid-cylinders and plungers between the platform and trucks for supporting the former by fluid contained in the cylinders, and liquid-ballast tanks at opposite ends of the platform with valves for emptying said tanks, substantially as described.

7. The apparatus herein described, consisting of railway-planes joined by vertical curves, trucks traveling thereon, connecting-rods supported by said trucks, plungers on said connecting-rods, and cylinders containing a liquid or other fluid, said cylinders being connected longitudinally of the railway, and a rigid platform supported by said cylinders, substantially as described.

8. The combination with a rigid burden-carrying platform, of means for supporting said platform consisting of columns of liquid or other fluid connected together in series longitudinally of the movement of the platform so that the column may become shorter or longer by the flow of fluid through the series, substantially as described.

9. The combination with a rigid burden-carrying platform, of means for supporting said platform consisting of columns of liquid or other fluid arranged in a plurality of series of columns, the columns in each series being arranged and connected together longitudinally of the movement of the platform so that the columns may become shorter or longer by the flow of fluid through each series and the columns of the different series being disconnected so that no flow of fluid is permitted between the columns transversely to the movement of the platform, substantially as described.

10. The combination with a rigid burden-carrying platform, of trucks, fluid-cylinders and plungers between the platform and trucks for supporting the platform by fluid contained in the cylinders, links N connecting the trucks at opposite sides, and the connecting-bars P extending longitudinally of the platform and secured to the trucks and jointed to the platform between the points of connection to the trucks, substantially as herein set forth.

11. The combination of the forked vibratory connecting-rods $m$, the hauling-bar $n$, and the detent $o$, substantially as described.

12. The combination of the yokes with the angle-bars and the end cylinders, substantially as described.

13. The combination with a rigid burden-carrying platform provided with trucks, and longitudinal series of cylinders and plungers between the platform and trucks for supporting the platform by fluid contained in the cylinders, of means whereby fluid may be supplied to any or all of the longitudinal series of cylinders, substantially as and for the purposes set forth.

14. The combination of the trucks and the hollow hauling-bar connected to said trucks with cylinders mounted on said bar and having their fluid-spaces connected through the hollow hauling-bar, substantially as described.

15. The combination of the trucks, the hauling-bar and the cylinders mounted thereupon, with the plungers fitted into the said cylinders and the hook and strap, substantially as described.

16. The combination of the hollow hauling-bar, the cylinders mounted thereon, the plungers and the hook and strap with the clevis, substantially as described.

In testimony whereof I have hereunto set my hand in the presence of two subscribing witnesses.

HENRY CURTIS SPALDING.

Witnesses:
C. J. SAWYER,
A. A. V. BOURKE.